United States Patent [19]
Dembosky et al.

[11] Patent Number: 5,628,701
[45] Date of Patent: May 13, 1997

[54] HYDRAULIC TENSIONER WITH SEALING ELEMENT

[75] Inventors: Stanley K. Dembosky; Roger T. Simpson, both of Ithaca, N.Y.

[73] Assignee: Borg-Warner Automotive, Inc., Sterling Heights, Mich.

[21] Appl. No.: 569,934

[22] Filed: Dec. 8, 1995

[51] Int. Cl.⁶ .................................................. F16H 7/22
[52] U.S. Cl. .................................................. 474/103; 474/110
[58] Field of Search .................................. 474/101, 103, 474/110, 138

[56] References Cited

U.S. PATENT DOCUMENTS

| | | | |
|---|---|---|---|
| 4,190,025 | 2/1980 | Wahl | 123/90.31 |
| 4,527,462 | 7/1985 | Okabe | 92/51 |
| 4,708,696 | 11/1987 | Kimura et al. | 474/103 |
| 4,790,796 | 12/1988 | Okabe et al. | 474/110 |
| 4,850,941 | 7/1989 | Sosson | 474/110 |
| 4,950,209 | 8/1990 | Kawashima et al. | 474/138 |
| 4,993,994 | 2/1991 | Ojima | 474/111 |
| 5,073,149 | 12/1991 | Maruyama et al. | 474/104 |
| 5,181,889 | 1/1993 | Maruyama et al. | 474/110 |
| 5,193,498 | 3/1993 | Futami | 474/110 X |
| 5,310,385 | 5/1994 | Suzuki | 474/110 |
| 5,346,436 | 9/1994 | Hunter et al. | 474/110 |
| 5,352,159 | 10/1994 | Suzuki et al. | 474/110 |
| 5,352,160 | 10/1994 | Sakai et al. | 474/135 |
| 5,366,415 | 11/1994 | Church et al. | 474/110 |

FOREIGN PATENT DOCUMENTS 2225080  6/1980  United Kingdom.

*Primary Examiner*—Roger J. Schoeppel
*Attorney, Agent, or Firm*—Hugh A. Abrams, Esq.; Greg Dziegielewski, Esq.

[57] ABSTRACT

A hydraulic tensioner with a sealing element to provide fluid leakage from a fluid filled chamber. The tensioner includes a housing having a fluid filled chamber and a hollow piston slidably received within the chamber and biased in a protruding direction by a spring. A sealing element is positioned in a groove in the piston or is mounted in the inner wall of the chamber. The sealing element is discontinuous so as to permit the passage of fluid from the fluid filled chamber to outside of the hydraulic tensioner. Fluid leakage is limited and controlled by discontinuity size of the sealing element.

7 Claims, 5 Drawing Sheets

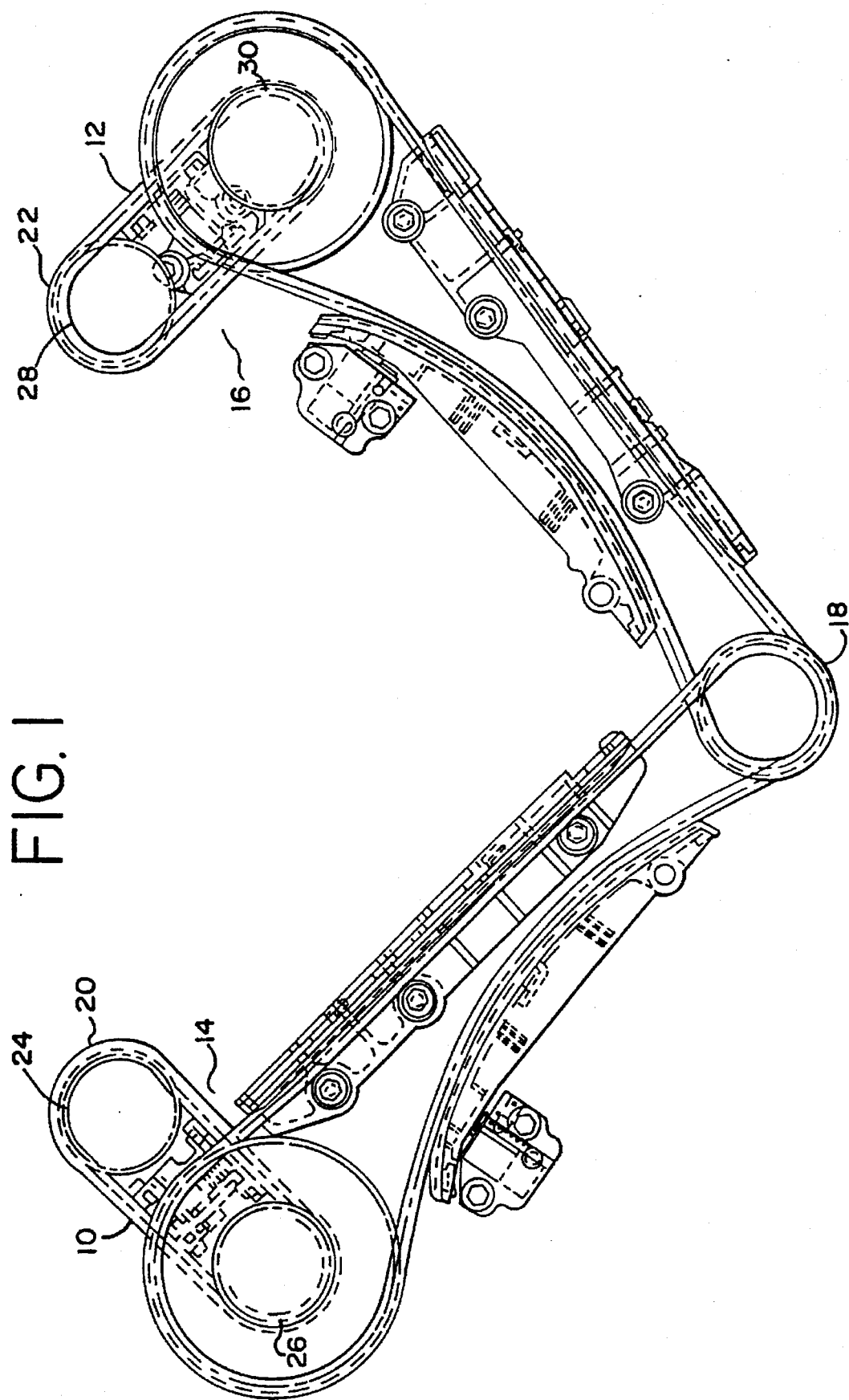

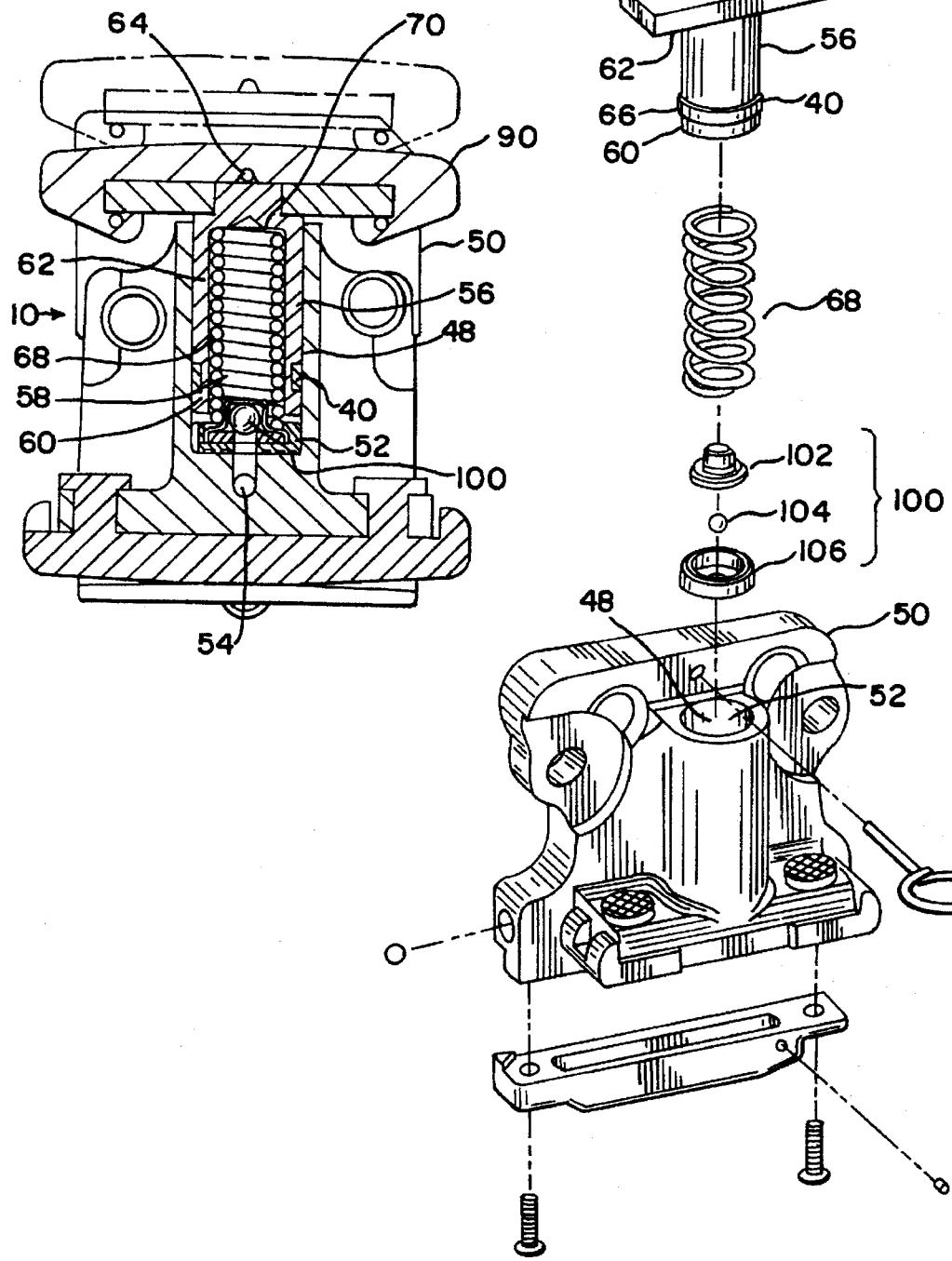

HYDRAULIC TENSIONER WITH SEALING ELEMENT

BACKGROUND OF THE INVENTION

Reference is made to co-pending application Ser. No. 08/569,729, filed Dec. 8, 1995, entitled "Hydraulic Tensioner With Check Valve Vent," which is assigned to the assignee of the present application and which is incorporated herein by reference.

The present invention relates to a hydraulic tensioner having a housing which includes a fluid chamber and a hollow piston slidably received within the chamber. More particularly, the present invention relates to such a tensioner with a sealing element positioned between the piston and the bore or inner lateral wall of the chamber to provide control of fluid leakage from the chamber.

Tensioning devices, such as hydraulic tensioners, are used as a control device for automotive timing drives. An automotive timing drive includes either a chain or belt which travels between a plurality of sprockets or pulleys. In an automotive application, the tension of the chain can vary greatly on the slack side of the chain as the chain travels between the sprockets. Likewise, the tension of the chain can further vary as the chain stretches due to wear. As a result, it is important to impart and maintain a certain degree of tension to the chain to maintain control over the chain as it travels between the sprockets. As the chain tension lessens due to wear, it is important to provide an adjustable tensioning member to maintain the proper tension of the chain.

Hydraulic tensioners are well known in the art such as Hunter et al., U.S. Pat. No. 5,346,436, which is owned by the assignee of the, present application and in incorporated herein by reference. Hunter et al. discloses a hydraulic tensioner with an air vent. However, hydraulic tensioners typically do not include a sealing element or they include a sealing element that provides a fluid tight chamber.

One example of a hydraulic tensioner with a sealing element is described in Sosson, U.S. Pat. No. 4,850,941. Sosson discloses a hydraulic tensioner, which includes a piston with a groove on its outer surface for receiving a sealing element between the groove and the lateral wall of the chamber. The sealing element has lips adapted to provide a seal between the groove, i.e., the outer surface of the piston, and the lateral wall of the chamber. The chamber becomes closed and sealed owing to the presence of the sealing element. The chamber is therefore fluid tight, and leakage from the chamber is prevented.

Another example of a hydraulic tensioner, which includes a sealing element is described in Wahl, U.S. Pat. No. 4,190,025. Wahl discloses a hydraulic tensioner, which includes an annular oil retainer piston with circumferential grooves for receiving inner and outer O-ring seals for sealingly engaging a plunger and the lateral wall of the chamber. The O-ring seals of Wahl provide a fluid tight chamber, and therefore leakage from the chamber is prevented.

The sealing element of the present invention, however, is a simple and inexpensive apparatus constructed to permit controlled fluid leakage from the chamber. Fluid flow out of the chamber is dependent on certain factors including the outer diameter of the piston, the inner diameter of the chamber, and the clearance between the outer diameter of the piston and the inner diameter of the chamber. In positioning a sealing element between the inner wall of the chamber and the outer wall of the piston, fluid flow out of the chamber can be limited and controlled. In particular, fluid flow out of the chamber can be limited and controlled by regulation of the size of a discontinuity, i.e., a space or gap, in the sealing element.

SUMMARY OF THE INVENTION

The present invention is directed to a hydraulic tensioner having a sealing element to provide controlled fluid leakage from the fluid chamber. The tensioner includes a housing having a hollow bore, and a hollow piston slidably received within the bore and biased in a protruding direction by a spring. A fluid chamber is defined by the bore and the piston. The chamber contains fluid of sufficient amount to bias the piston outward. The piston has an upper end which is positioned above the fluid chamber. The piston has a lower end which is located within the fluid chamber. A sealing element is positioned between the piston and the inner lateral wall of the chamber, between the upper and lower ends of the piston. The sealing element is discontinuous, i.e., there is a space or gap in the sealing element, which allows for the pad, sage of fluid. Therefore, fluid from the fluid chamber is allowed to leak, or pass through, the discontinuity of the sealing element out of the chamber along the outside of the piston to the outside of the tensioner.

The piston of a hydraulic tensioner must be able to extend outward as the chain moves and stretches with the increased loads from higher engine speeds. The piston is forced outward by the force of fluid pressure and the spring against the top of the piston. The piston is forced inward by the force of the chain against a tensioner arm or face at the top of the piston. The distance of outward travel of the piston is dependent on the balance of the hydraulic and spring forces outward against the chain force inward. Additionally, fluid may exit the chamber from around the piston. The fluid flow out of the chamber around the piston is dependent on certain factors such as: piston diameter; bore or chamber diameter; piston to chamber clearance; the duration, magnitude and duty cycle of force pushing the piston down; the viscosity of the fluid; fluid back flow through the check valve due to check valve response; and amounting of air bleed through the air vents. The fluid flow out of the chamber is also dependent on certain factors such as: the inlet valve diameter; check valve response; engine oil pressure; internal spring force; check valve ball travel; and frequency and duty cycle of the chain as it goes slack.

Fluid leakage from the chamber effects tensioner performance. It should be apparent that fluid leakage varies according to the piston to chamber clearance. With a chamber with a particular inner diameter, a piston with a smaller outer diameter will have greater leakage because of the greater area for leakage between the piston outer diameter and the chamber inner diameter. Likewise, a piston with a larger outer diameter will have less leakage because of the smaller area for leakage between the piston outer diameter and the chamber inner diameter. The sealing element of the present invention provides a matched piston and bore (as a result of the seal) and controls the amount of leakage past the piston.

The main adjustable item that can control fluid leakage is varying the clearance between the piston outer diameter to the chamber inner diameter. The piston and chamber are manufactured to certain tolerances. It is, however, difficult to maintain the close manufacturing tolerances needed to fit the piston to the chamber. At the present time, during the tensioner assembly process, many pistons are fitted with a particular chamber. The piston with the outer diameter that most closely matches the inner diameter of the chamber is the piston that is selected for that particular tensioner. With a sealing element, this assembly process is eliminated because a sealing element fills the clearance between the piston and the chamber. A sealing element, therefore, allows for greater tolerances to be present between the piston and the chamber. With a sealing element, tensioner manufacturing costs are reduced because only one size piston need be manufactured.

By positioning a sealing element between the piston outer diameter and the chamber inner diameter, the fluid leakage path is limited and controlled. In particular, the leakage path is limited to the area of the opening or gap in the sealing element. In one embodiment, a sealing element is provided with one or more discontinuities. In another embodiment, two or more sealing elements are present such that one or more discontinuities are formed at the juncture of these sealing elements. Leakage again would be limited to the discontinuities between the sealing elements.

In one embodiment, the piston outer diameter is provided with a groove for receiving the sealing element. The sealing element, however, need not be limited to placement around the piston. In another embodiment, the sealing element is mounted in the inner wall of the chamber. The inner diameter of the sealing element would then seal to the outer diameter of the piston.

The discontinuity of the sealing element is only dependent on the chamber diameter and oil temperature. Because the discontinuity is only dependent on two factors, the range of leakage from the tensioner can be readily controlled. The required leakage flow can also be more closely matched to the desired performance of the tensioner.

In addition, with a sealing element, the piston can retract when no fluid pressure is present. As the piston retracts due to gravitational forces, fluid in the chamber will be forced out through the opening in the sealing element. Because less fluid will then be present in the chamber, the piston can retract even further, again allowing fluid to exit the chamber through the gap in the sealing element.

In one preferred embodiment of the tensioner, a passage is provided in the housing to connect the chamber with a source of fluid pressure. A check valve is provided between the chamber and the source of fluid pressure to permit fluid flow into the chamber while blocking flow in the reverse direction. In this preferred embodiment, the check valve may be a ball and spring check valve, a spring valve, or a variable orifice check valve.

In another preferred embodiment, the tensioner includes an air vent to provide for the removal of air from the chamber. The vent is provided within the chamber and includes a disk having a first surface, a second surface, and a periphery. At least one channel is formed on at least one surface of the disk. The channel has a first end terminating at the periphery of the disk and a second end terminating in a position to establish a connection between the atmosphere and the chamber through the aperture in the piston. Preferably, the tensioner includes the check valve and the air vent.

In a most preferred embodiment, the tensioner includes a check valve vent. A check valve is surrounded or seats within a seat portion, also known as the check valve seat. The check valve permits fluid flow into the chamber while blocking flow in the reverse direction while the check valve seat has a channel at its bottom which allows air to exit the fluid chamber.

BRIEF DESCRIPTION OF THE DRAWINGS

FIG. 1 is a schematic illustrating a timing chain system with dual overhead camshafts and a camshaft-to-camshaft drive system;

FIG. 2 is a sectional view of a hydraulic tensioner incorporating the sealing element of the present invention;

FIG. 3 is an exploded view of a hydraulic tensioner incorporating the sealing element of the present invention;

DETAILED DESCRIPTION OF THE PRESENTLY PREFERRED EMBODIMENTS

Figure 4:
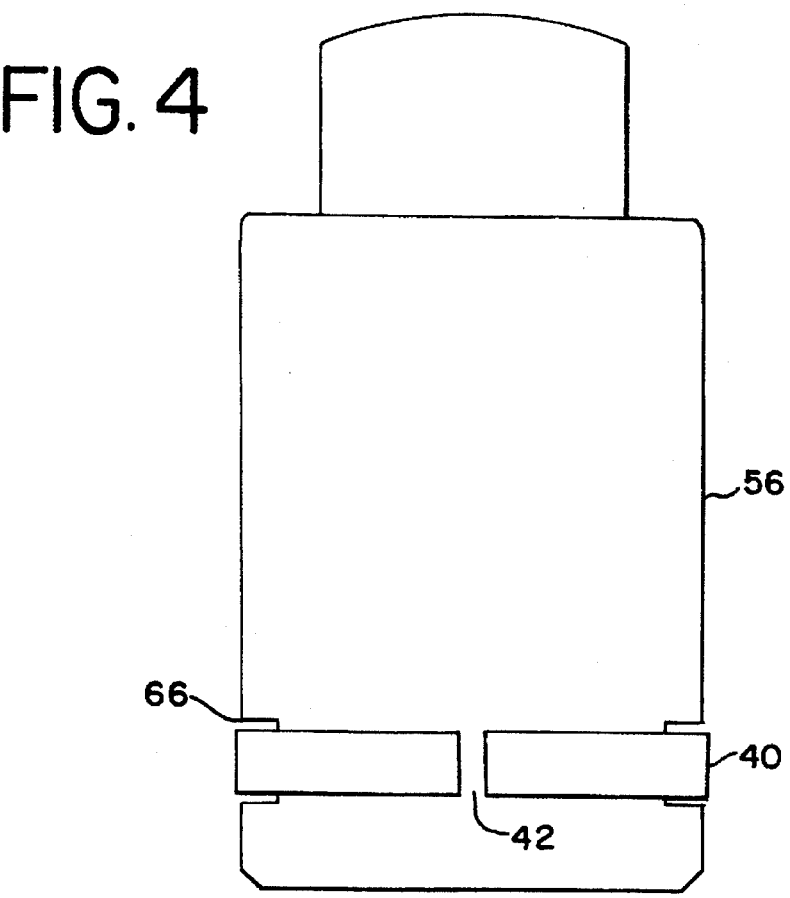
FIG. 4 is a side view of a piston of a hydraulic tensioner incorporating the sealing element of the present invention.

Turning now to the drawings, FIG. 1 illustrates two hydraulic tensioners 10, 12 positioned in opposite directions in a timing chain system with dual overhead camshafts 14, 16 and a camshaft to camshaft drive system to drive a crankshaft 18. Chains 20, 22 are wrapped about sprockets 24, 26, 28 and 30 of the camshafts and the tensioners 10, 12 are provided to maintain chain tension in the cam-to-cam drive chain.

Referring more particularly to FIGS. 2 and 3, a hydraulic tensioner 10 (or 12) of FIG. 1 is shown in an inverted position for ease of the viewer. FIG. 2 illustrates the most preferred embodiment of the hydraulic tensioner 10 incorporating the sealing element 40. The tensioner 10 includes a housing 50 having a chamber 52 connected through a passageway 54 to a pressure fluid source (not shown). The fluid source may be an oil pump, oil reservoir or the like. Fluid enters the chamber formed by the bore 48 and hollow piston 56, as described below. Preferably, the chamber is a cylindrical bore 48. The chamber 52 slidably receives a hollow piston 56, also preferably cylindrical, having an interior space 58, a lower end 60, an upper end 62 with an aperture 64, a groove 66, and a sealing element 40. The lower end 60 is positioned inside the chamber 52. Preferably, the aperture 64 is located in about the center of that upper end 62. The upper end 62 contacts the tensioner face 90. The tensioner face 90 provides tension along the chain/belt (not shown). A spring 68 contacts the inside 70 of the upper end 62 of the piston 56 to bias the piston 56 in a protruding or outward direction.

Figure 5:
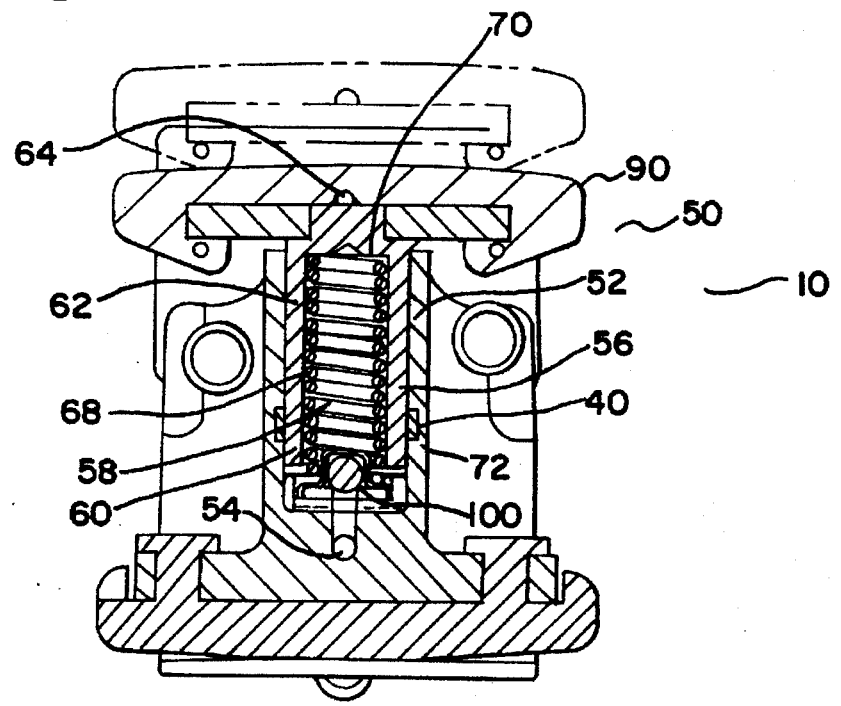
FIG. 5 is a side view of a chamber of a hydraulic tensioner incorporating the sealing element of the present invention.

To control piston to chamber clearance, a sealing element 40 is positioned around the outside of the piston 56 and against the lateral wall of the chamber 52. FIGS. 4 and 5 show two different embodiments for positioning a sealing element of the present invention. FIG. 4 shows a sealing element 40 which is mounted in a groove 66 of the piston 56. The sealing element has a gap or a discontinuity 42 that allows fluid to flow along the outside of the piston from the chamber to the outside. FIG. 5 shows a sealing element 40 mounted in a groove 72 of the lateral wall of the chamber 52 with a gap 42. The inner diameter of the sealing element 40 then seals against the outer diameter of the piston 56 but allows fluid passage through the gap.

Figure 6:
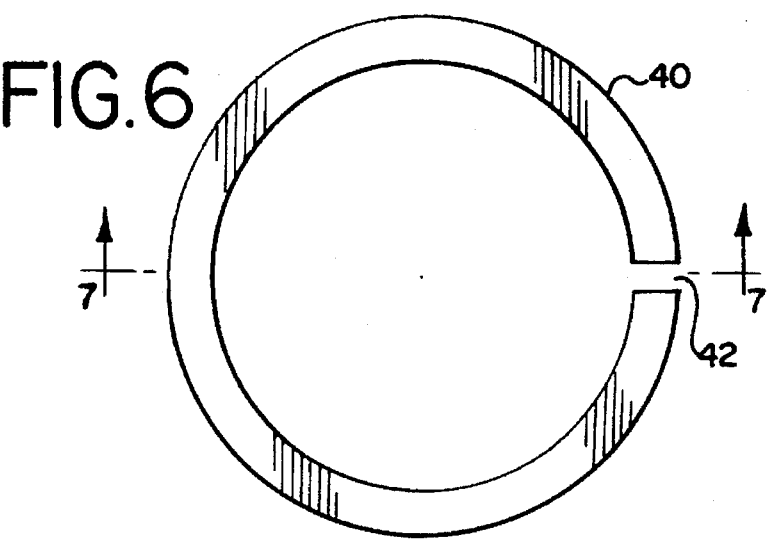
FIG. 6 is a top view of one embodiment of a sealing element of the present invention.
Figure 7:
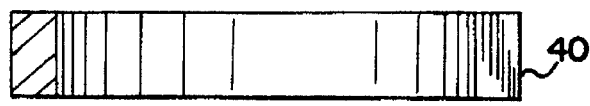
FIG. 7 is a side view of one embodiment of a sealing element of FIG. 6.
Figure 8:
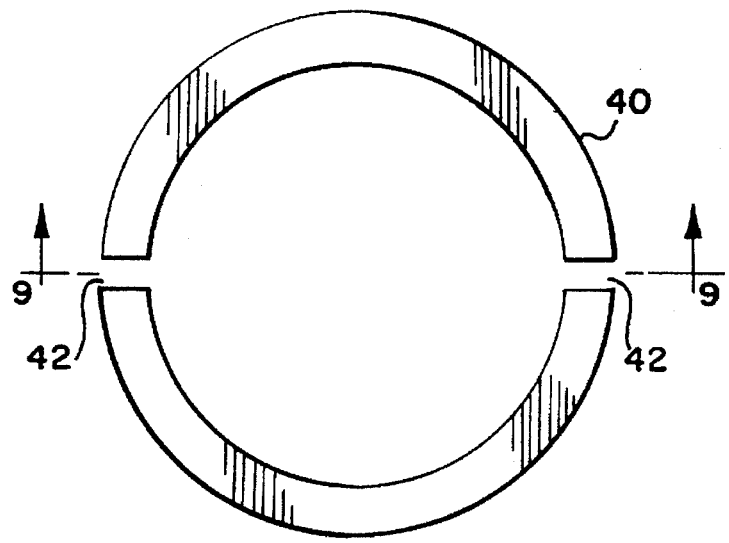
FIG. 8 is a top view of another embodiment of a sealing element of the present invention.
Figure 9:
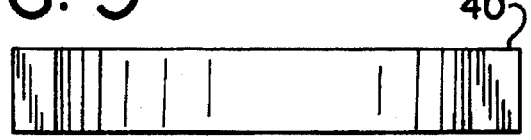
FIG. 9 is a side view of another embodiment of a sealing element of FIG. 8.

The sealing element 40 is preferably a seal ring with a discontinuity 42. The discontinuity 42 of the sealing element 40 allows for fluid to leak from the lower end 60 to the upper end 62 of the piston 56. Fluid therefore leaks from the fluid chamber 52 through the discontinuity 42 of sealing element 40. FIGS. 6 and 7 are top and side views, respectively, of one embodiment of a sealing element of the present invention. In this embodiment, the discontinuity 42 is a single gap or space in a sealing element 40. FIGS. 8 and 9 are top and side views, respectively, of another embodiment of a sealing element of the present invention. In this embodiment, two or more sealing elements 40 form one or more discontinuities 42 at the juncture of the sealing elements.

In one embodiment of the tensioner, a check valve is provided between the chamber and the passageway, and thus the source of fluid pressure, to permit fluid flow into the chamber while blocking fluid flow in the reverse direction. Preferably, a check valve includes a ball and a spring biasing the ball toward a ball seat. In another embodiment, the check valve may be a variable orifice check valve as shown and described in U.S. Pat. No. 5,258,820 and U.S. Pat. No. 5,277,664, both of which are owned by the assignee of the present application and both of which are incorporated herein by reference.

In another embodiment, the tensioner includes an air vent provided within the chamber. The vent preferably includes a disk biased by the spring against the inside of the upper end of the piston. The disk preferably has at least one channel formed on at least one side of the disk. The channel has a first end at the periphery of the disk and a second end at a position to establish a connection between the atmosphere and the chamber through the aperture in the upper end 62 of the piston 56. Such an air vent is shown and described in U.S. Pat. No. 5,346,436 which is owned by the assignee of the present application and which is incorporated herein by reference.

Referring once again to FIGS. 2 and 3 to illustrate how a check valve and an air vent are incorporated into a hydraulic tensioner incorporating a sealing element of the present invention. In a preferred embodiment, the tensioner includes a check valve vent 100, such as is disclosed in co-pending application Ser. No. 08/569,729, filed Dec. 8, 1995. A check valve assembly 102 and ball 104 is surrounded or seats within a seat portion, also known as a check valve seat 106. The check valve seat 106 has a channel at its bottom. In this way, the channel of the check valve seat 106 allows air to exit the chamber 52, while the check valve assembly 102 and ball 104 permits fluid flow into the chamber 52 while blocking fluid flow in the reverse direction.

More particularly, high pressure fluid opens the check valve vent 100 such that fluid flows into the chamber 52. As the fluid fills the chamber 52, the piston 56 is moved outward by the force of the pressurized fluid and the spring 68. The piston 56 continues to move outward until the inward force of the chain on the piston 56 balances the outward force of the spring 68 and fluid. At this point, the ball check valve vent 100 closes and prevents further fluid flow.

When the chain slackens due to wear or load fluctuations, the piston 56 moves outward again and the valve opens to allow more fluid to flow into the chamber 52. During the period in which the piston force and chain force are balanced, no fluid flow occurs with the exception of leakage through the discontinuity 42 in the sealing element 40. By precisely defining the discontinuity 42, the piston 56 can be sealed against the bore 48 and a controlled amount of fluid can escape through the discontinuity 42 of the sealing element 40 to provide a pressure relief mechanism.

Figure 10:
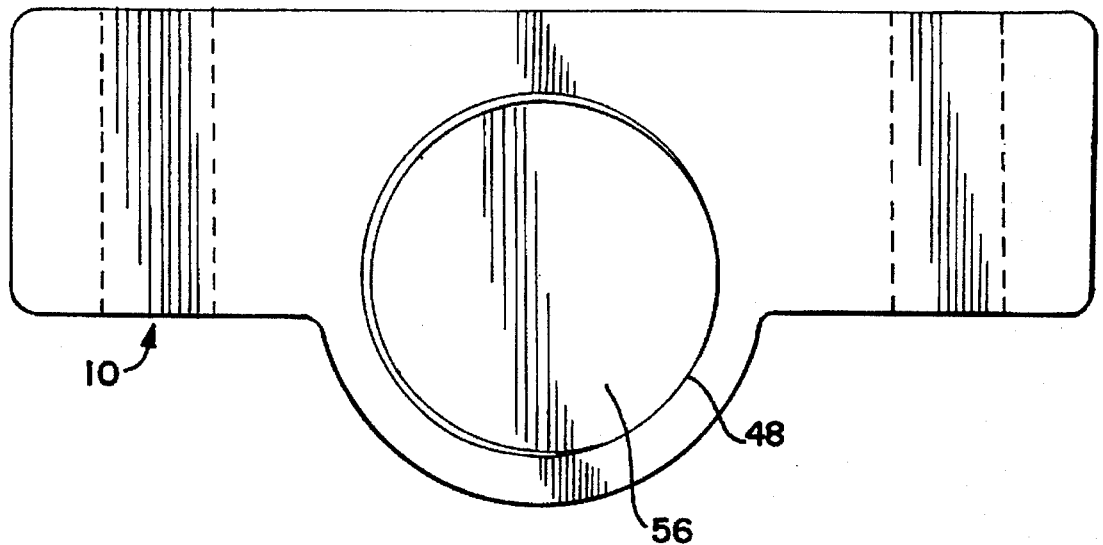
FIG. 10 is a top view of a hydraulic tensioner of the prior art without a sealing element.
Figure 11:
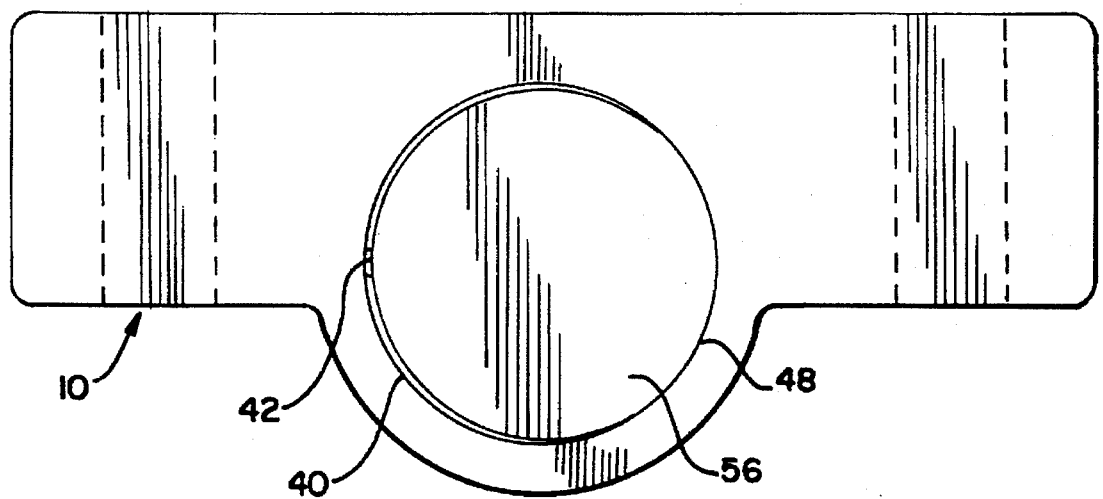
FIG. 11 is a top view of a piston and housing of hydraulic tensioner incorporating a sealing element of the present invention.

Turning now to FIGS. 10 and 11, one skilled in the art can recognize how fluid leakage can be limited and controlled by using a sealing element. FIG. 10 illustrates fluid leakage, without a sealing element. It should be apparent that leakage will vary greatly according to the piston to chamber clearance. A piston with a smaller outer diameter will have greater leakage because of the greater area for leakage between the piston and the lateral wall of the chamber. Likewise, a piston with a larger outer diameter will have less leakage because of the smaller area for leakage between the piston and the lateral wall of the chamber. FIG. 11 illustrates how fluid leakage with a sealing element 40 is limited and controlled. Fluid can only pass through, or leak, through the discontinuity 42 of the sealing element 40, and not through the sealing element 40 itself. The sealing element 40 therefore limits the amount of the fluid that leaks through the discontinuity 42 thereby controlling the leakage of fluid from the chamber 52.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner, comprising:
   a housing having a generally cylindrical bore,
   a hollow piston slidably received within said bore to define a fluid chamber with said bore, said piston having an upper and a lower end,
   a spring biasing said piston in the protruding direction from said housing,
   a check valve to permit the flow of fluid from an external source through the valve and into said fluid chamber, and
   a sealing element positioned between said piston and the inner lateral wall of said bore, said sealing element being constructed to permit the passage of fluid past said sealing element along the outer surface of said piston from said lower end to said upper end of said piston.

2. The hydraulic tensioner of claim 1 wherein said sealing element is substantially circular with a discontinuity along its circumference.

3. The hydraulic tensioner of claim 2 wherein said passage of fluid through said sealing element occurs through said discontinuity.

4. The hydraulic tensioner of claim 1 wherein said sealing element further comprises a seal ring of circular cross-section with a discontinuity along its circumference.

5. The hydraulic tensioner of claim 4 wherein said sealing element is comprised of one or more sealing element portions, wherein said discontinuity is present between the ends of adjacent sealing element portions.

6. The hydraulic tensioner of claim 1 wherein said sealing element is positioned within a groove of said piston.

7. The hydraulic tensioner of claim 1 wherein said sealing element is positioned within a groove of said bore.

* * * * *